United States Patent [19]
Larson

[11] Patent Number: 5,630,671
[45] Date of Patent: May 20, 1997

[54] LOCKING DEVICE FOR A BEARING ASSEMBLY

[75] Inventor: John A. Larson, New Hartford, Conn.

[73] Assignee: The Torrington Company, Torrington, Conn.

[21] Appl. No.: 521,770

[22] Filed: Aug. 31, 1995

[51] Int. Cl.$^6$ ............................................. F16B 4/00
[52] U.S. Cl. ............................... 403/28; 403/30; 403/273; 384/537; 384/585; 29/447
[58] Field of Search ................................ 403/273, 28, 29, 403/30; 285/381 A, 381 B, 381 C, 381 D; 29/447, 898.07; 384/537, 585, 493, 584

[56] References Cited

U.S. PATENT DOCUMENTS

| | | | |
|---|---|---|---|
| 3,588,208 | 6/1971 | Kane | 384/541 |
| 3,961,853 | 6/1976 | Grimpe | 403/273 |
| 4,149,911 | 4/1979 | Clabburn | 285/381 A X |
| 4,403,814 | 9/1983 | Koss et al. | 308/236 |
| 4,537,519 | 8/1985 | LaRou et al. | 384/478 |
| 4,872,713 | 10/1989 | Kapgan | 285/381 B |
| 4,980,960 | 1/1991 | Usui et al. | 29/447 |
| 4,997,297 | 3/1991 | Blount | 384/585 |
| 5,067,827 | 11/1991 | Bokel | 384/537 |
| 5,197,808 | 3/1993 | Takata | 384/585 X |
| 5,277,435 | 1/1994 | Krämer et al. | 279/9.1 |
| 5,338,070 | 8/1994 | Horikawa et al. | 285/381 A X |

FOREIGN PATENT DOCUMENTS

| | | | |
|---|---|---|---|
| 372153 | 8/1921 | Germany | 29/447 |

*Primary Examiner*—Harry C. Kim
*Attorney, Agent, or Firm*—John C. Bigler

[57] ABSTRACT

An annular collar includes a first clamping surface to be positioned radially outwardly of a surface of a bearing inner ring. The annular collar is made of a thermoelastic material such that an increase in temperature decreases the circumference of the annular collar and causes the first clamping surface to clamp against the surface of the bearing inner ring. The thermoelastic material may be a shape memory alloy or a polymer.

20 Claims, 1 Drawing Sheet

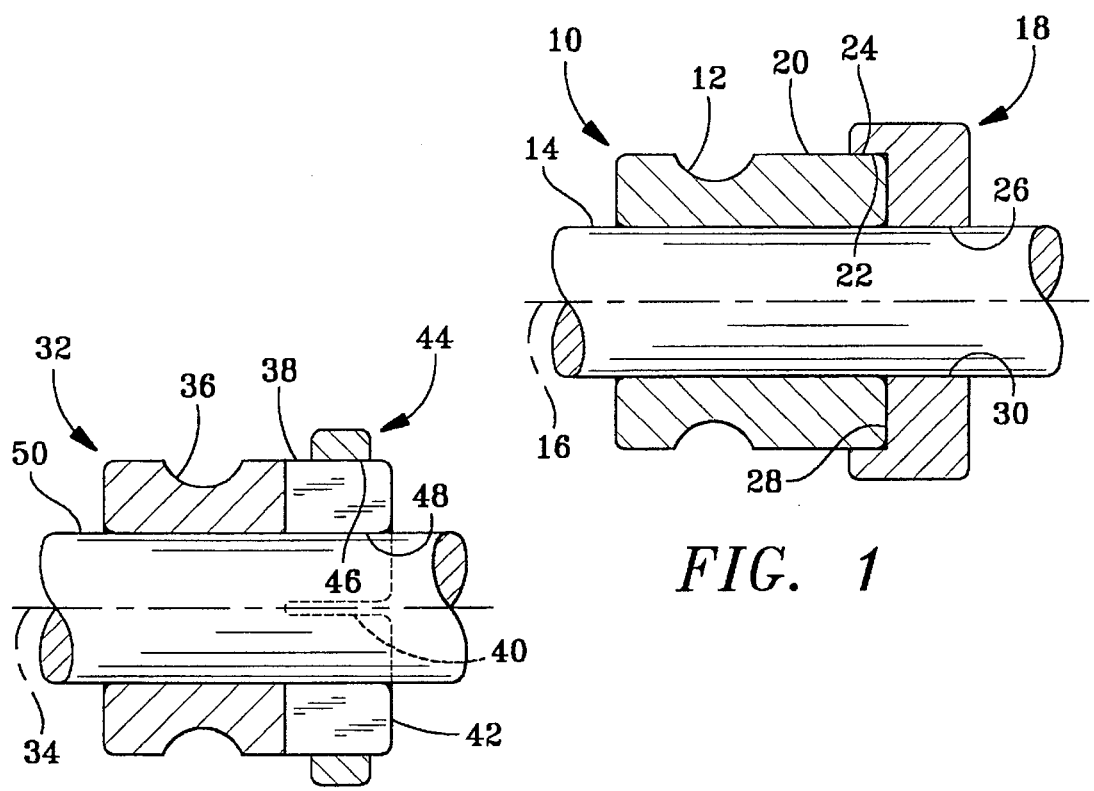
FIG. 1
FIG. 2
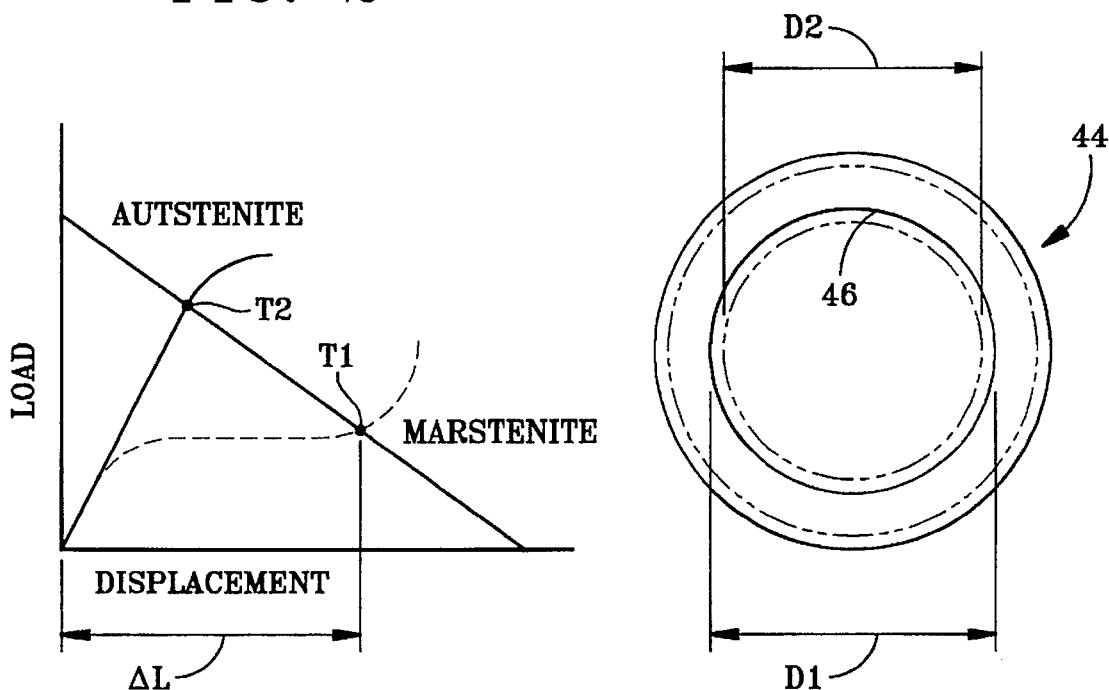
FIG. 3
FIG. 4

LOCKING DEVICE FOR A BEARING ASSEMBLY

BACKGROUND OF THE INVENTION

This invention relates generally to devices for securing a bearing assembly to a shaft and, more particularly, to a locking device for clamping a bearing inner ring against a shaft.

Bearings are commonly made with a "wide" inner ring to facilitate positioning and mounting of the bearings on straight shafts. The inner ring of such bearings is extended axially and fitted with an eccentric locking collar, clamp-type locking ring, set screws or similar device to lock the bearing to the shaft. The bearings may be fitted with balls or other rollers and may have a cylindrical or spherical outer ring.

Although such bearings generally work well, installation of the locking devices may be difficult in some applications. For example, tightening the set screws or striking a drift against the eccentric locking collar may not be convenient when access is limited. In addition, such mechanical means may eventually become worn and set screws may be lost, particularly after repeated installation and removal of the bearings.

The foregoing illustrates limitations known to exist in present locking devices for bearing assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a locking device comprising an annular collar having a circumference and a first clamping surface to be positioned radially outwardly of a surface of the bearing inner ring. The annular collar is made of a thermoelastic material such that an increase in temperature decreases the circumference of the annular collar and causes the first clamping surface to clamp against the bearing inner ring.

In another aspect of the present invention, this is accomplished by providing a method of locking a bearing inner ring to a shaft by increasing the temperature of a collar made of thermoelastic material.

The foregoing and other aspects will become apparent from the following detailed description of the invention when considered in conjunction with the accompanying drawing figures.

BRIEF DESCRIPTION OF THE DRAWING FIGURES

FIG. 1 is a cross-sectional view illustrating a bearing inner ring and an embodiment of the locking device for a bearing assembly of the present invention;

FIG. 2 is a cross-sectional view illustrating a bearing inner ring and a second embodiment of the locking device for a bearing assembly of the present invention;

FIG. 3 is a schematic diagram illustrating load, displacement, temperature and crystal structure relationships for a particular shape memory alloy; and FIG. 4 is an end view of the annular collar of the locking device for a bearing assembly shown in FIG. 2, with phantom lines to indicate the annular collar at a higher temperature.

DETAILED DESCRIPTION

Referring now to the drawings, FIG. 1 illustrates bearing inner ring 10 with raceway 12 and mounted on shaft 14, concentric about shaft axis 16, by annular collar 18. Annular collar 18 comprises one embodiment of the present invention.

Although raceway 12 suggests a bearing with balls as anti-friction elements, bearing inner ring 10 may also be the inner ring of a plain bearing or a bearing with rollers of various configurations. Preferably, bearing inner ring 10 is extended axially from raceway 12 as optional bearing inner ring extension 20. Annular collar 18 may have various configurations other than the substantially square cross section illustrated in FIG. 1.

Annular collar 18 is concentric about axis 16 and includes first clamping surface 22 positioned radially outwardly of bearing inner ring surface 24. Annular collar 18 is made of a "thermoelastic" material such that an increase in temperature of annular collar 18 decreases its circumference and causes first clamping surface 22 to clamp against bearing inner ring surface 24. More generally, a thermoelastic material is understood to be a material capable of recovering its size and shape, as a function of its temperature.

Annular collar 18 has central bore 26 that is large enough to permit sliding of annular collar 18 along shaft 16 when the annular collar is chilled for installation. Counterbore bottom surface 28 serves as a stop to ensure a predetermined overlap occurs as annular collar 18 is moved axially against bearing inner ring 10. First clamping surface 22 may be knurled to better grip bearing inner ring surface 24 and prevent relative rotation or axial movement of the two surfaces when the clamping force is applied after installation.

Locking of inner bearing ring 10 on shaft 16 may result from a radially inward deflection of bearing inner ring extension 20 against shaft 16 when the temperature of annular collar 18 is increased. To facilitate this deflection, bearing inner ring extension 20 may include one or more axially extending slots. Alternatively, or additionally, central bore 26 may be dimensioned such that second clamping surface 30 clamps against shaft 16 when the temperature of annular collar 18 is increased. Second clamping surface 30 may also be knurled to better grip shaft 16.

FIG. 2 illustrates a second embodiment of the locking device of the present invention. Bearing inner ring 32 is extended axially with respect to axis 34 and away from raceway 36 to for inner bearing ring extension 38. One or more optional slots 40 may extend axially to end 42 of bearing inner ring 32 and under annular collar 44, as shown. Annular collar 44 includes first clamping surface 46 positioned radially outwardly of optional slots 40 of bearing inner ring extension 38.

Annular collar 44 is similar to annular collar 18 of the first embodiment and is made of a thermoelastic material such that an increase in temperature decreases its circumference and causes first clamping surface 46 to clamp against bearing inner ring extension 38. As a result, inner surface 48 of bearing inner ring extension 38 is deflected radially inward and against shaft 50 to lock bearing inner ring 32 on the shaft. Optional slots 40 facilitate this radially inward deflection.

One type of thermoelastic material that may be used to make annular collar 18 or 44 is known as "shape memory" material. Such materials undergo dramatic property changes when heated above or cooled below a predetermined temperature. FIG. 3 shows schematically how a particular Ni—Ti shape memory alloy changes dimension and strength (load) as a result of a temperature dependent change in crystal structure. For example, at a low temperature $T_1$ (say, −30 degrees F) annular collar 44 made of this Ni—Ti shape memory alloy can be easily slipped over bearing inner ring extension 38. When annular collar 44 is raised to temperature $T_2$ (say, +15 degrees F), the material transforms from soft martensite with diameter $D_1$ to much stronger austenite with a smaller diameter $D_2$, as illustrated in FIG. 4. This smaller diameter provides sufficient clamping force to lock inner ring 32 on shaft 50. It should be noted that the temperatures are variables and that those described above are for illustration only. Other Ni—Ti shape memory alloys with different transformation temperatures may be used as well as shape memory alloys comprising other elements, such as, for example, Cu—Zn—Al alloys, Cu—Al—Ni alloys, Ti—V alloys, and iron base alloys of Fe—Si—Mn. Such shape memory alloys are commercially available.

Another type of shape memory material that may be used with the present invention is known as shape memory polymer. One example is a polyurethane-based polymer manufactured by Mitsubishi Heavy Industries, Ltd. and marketed by Memry Corporation of Brookfield, Conn.. It should be understood that annular collar 18 or 44 may have a crimped or corrugated configuration to produce a circumference that is reduced as a result of a predetermined change in temperature even though the shape memory material itself does not shrink.

From the above description, it will be apparent that the present invention provides a new and simple method of locking a bearing assembly on a shaft. The present locking device can be used in applications where limited access would make the use of alternative devices such as set screws or eccentric locking collars difficult. Unlike set screw devices, there are no small parts that may be lost. In addition, the locking operation is infinitely reversible, allowing the locking device to be used repeatedly without wear.

Having described the invention, what is claimed is:

1. A bearing inner ring in combination with an annular collar for reversibly locking the bearing inner ring against a shaft, the combination comprising:
    the bearing inner ring;
    the annular collar having a circumference and a first clamping surface to be positioned radially outwardly of a surface of the bearing inner ring;
    the annular collar being made of a thermoelastic material such that an increase in temperature decreases the circumference of the annular collar and causes the first clamping surface to clamp against the surface of the bearing inner ring.

2. The combination according to claim 1, wherein the first clamping surface is knurled such that gripping of the surface of the bearing inner ring by the first clamping surface is enhanced.

3. The combination according to claim 1, wherein the annular collar has a second clamping surface such that the increase in temperature causes the second clamping surface to clamp against the shaft.

4. The combination according to claim 3, wherein the second clamping surface is knurled such that gripping of the shaft by the second clamping surface is enhanced.

5. The combination according to claim 1, wherein the increase in temperature causes the first clamping surface to deflect the bearing inner ring radially inwardly such that the bearing inner ring clamps against the shaft.

6. The combination according to claim 1, wherein the thermoelastic material is a Ni—Ti alloy.

7. The combination according to claim 1, wherein the thermoelastic material is a polymer.

8. A bearing inner ring in combination with an annular collar for reversibly locking the bearing inner ring against a shaft, the combination comprising:
    the bearing inner ring;
    the annular collar having a circumference and a first clamping surface to be positioned radially outwardly of a surface of the bearing inner ring;
    the annular collar being made of a thermoelastic shape memory material that changes dimension and strength based on a temperature dependent change in crystal structure such that a change in temperature reversibly causes the first clamping surface to clamp against the bearing inner ring.

9. The combination according to claim 8, wherein the thermoelastic shape memory material exhibits a thermoelastic transformation from a martensitic structure to an austenitic structure.

10. The combination according to claim 9, wherein the thermoelastic shape memory material is selected from the group of materials consisting of Ni—Ti, Cu—Zn—Al, Cu—Al—Ni, Ti—V and Fe—Si—Mn alloys.

11. The combination according to claim 8, wherein the first clamping surface is knurled such that gripping of the surface of the bearing inner ring by the first clamping surface is enhanced.

12. The combination according to claim 8, wherein the annular collar has a second clamping surface such that the change in temperature causes the second clamping surface to clamp against the shaft.

13. The combination according to claim 12, wherein the second clamping surface is knurled such that gripping of the shaft by the second clamping surface is enhanced.

14. The combination according to claim 8, wherein the change in temperature causes the first clamping surface to deflect the bearing inner ring radially inwardly such that the bearing inner ring clamps against the shaft.

15. A bearing in combination with an annular collar for reversibly locking the bearing on a shaft, the combination comprising:
    a bearing inner ring extension extending axially outward from a bearing inner ring raceway, the extension having a radially outward surface; and
    the annular collar having a circumference and a first clamping surface positioned radially outwardly of the surface of the bearing inner ring extension;
    the annular collar being made of a thermoelastic material such that an increase in temperature decreases the circumference and causes the first clamping surface to clamp against the surface of the bearing inner ring extension.

16. The combination for locking a bearing on a shaft according to claim 15, wherein the bearing inner ring extension includes at least one axially extending slot such that the decrease in the circumference of the annular collar facilitates a radially inward movement of the bearing inner ring extension against the shaft.

17. A method of reversibly locking a bearing inner ring to a shaft, the method comprising the steps of
    providing the shaft;
    providing an annular collar having a circumference and a first clamping surface, the annular collar being made of a thermoelastic material;
    positioning the annular collar such that the first clamping surface is radially outward of a surface of the bearing inner ring; and increasing the temperature of the annular collar such that the first clamping surface is forced against the bearing inner ring and such that the bearing inner ring is locked against the shaft.

18. The method of reversibly locking a bearing inner ring to a shaft according to claim 17, wherein the step of increasing the temperature of the annular collar forces a second clamping surface of the annular collar against the shaft.

19. A method of reversibly locking a bearing inner ring to a shaft, the method comprising the steps of providing the shaft;

providing an annular collar having a circumference and a first clamping surface, the annular collar being made of a shape memory material that changes dimension and strength based on a temperature dependent change in crystal structure;

positioning the annular collar such that the first clamping surface is radially outward of the bearing inner ring; and changing the temperature of the annular collar such that the first clamping surface is forced against the bearing inner ring and such that the bearing inner ring is locked against the shaft.

20. The method of reversibly locking a bearing inner ring to a shaft according to claim 19, wherein the step of changing the temperature of the annular collar forces a second clamping surface of the annular collar against the shaft.

* * * * *